United States Patent

[11] 3,624,601

| [72] | Inventors | William S. Routzahn<br>614 Marshall Road, Glen Burnie, Md. 21061;<br>Denis S. Moeser, 1301 Centerville Ave., Belleville, Ill. 62221 |
|---|---|---|
| [21] | Appl. No. | 849,661 |
| [22] | Filed | Aug. 13, 1969 |
| [45] | Patented | Nov. 30, 1971 |

[54] VEHICLE SEATBELT WARNING AND IGNITION CONTROL SYSTEM
1 Claim, 5 Drawing Figs.

[52] U.S. Cl. .................................................. 340/52 E,
307/10, 200/61.44, 180/82.8
[51] Int. Cl. ........................................................ G08b 5/00,
B60q 1/00
[50] Field of Search............................................ 340/52, 52
E, 278; 307/10; 180/82.8; 200/61.44, 61.58

[56] References Cited
UNITED STATES PATENTS

| 2,510,115 | 6/1950 | Jakosky ................. | 180/82.8 UX |
| 2,880,789 | 4/1959 | Leibinger ................. | 180/82.8 UX |
| 2,996,587 | 8/1961 | McCarthy ................. | 200/61.58 |
| 3,133,277 | 5/1964 | Hood ............................. | 340/278 |
| 3,147,819 | 9/1964 | Keleher ........................ | 180/82 |

*Primary Examiner*—Alvin H. Waring
*Attorney*—Sherman Levy

ABSTRACT: A safety seatbelt that is constructed so that a vehicle cannot be operated until the seatbelt is properly fastened about a person, and wherein the seatbelt is electrically connected to the ignition switch of a vehicle, so that the circuit cannot be completed and the engine operated until the seatbelt is properly connected in place. In one form of the device, a seatbelt is provided for aircraft, buses and trains, and wherein a lighting system of warning panel is provided to indicate when one or more passengers does not have his or her seatbelt engaged.

PATENTED NOV 30 1971
3,624,601
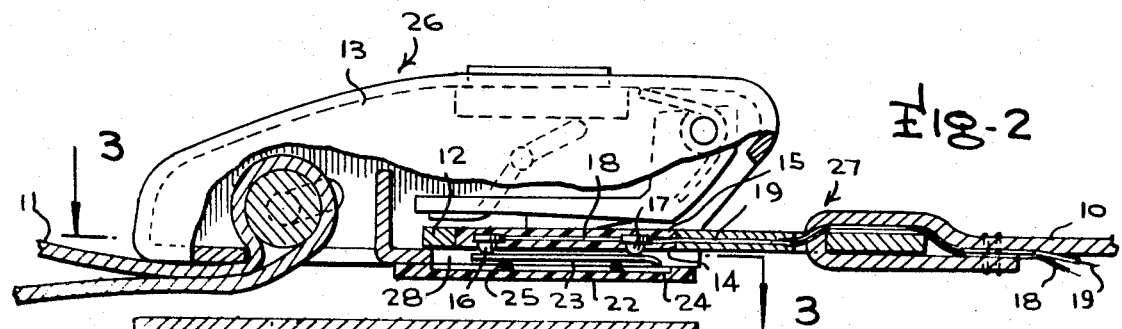
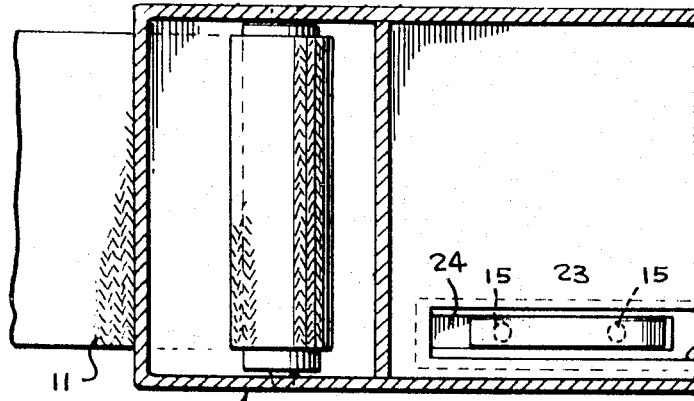
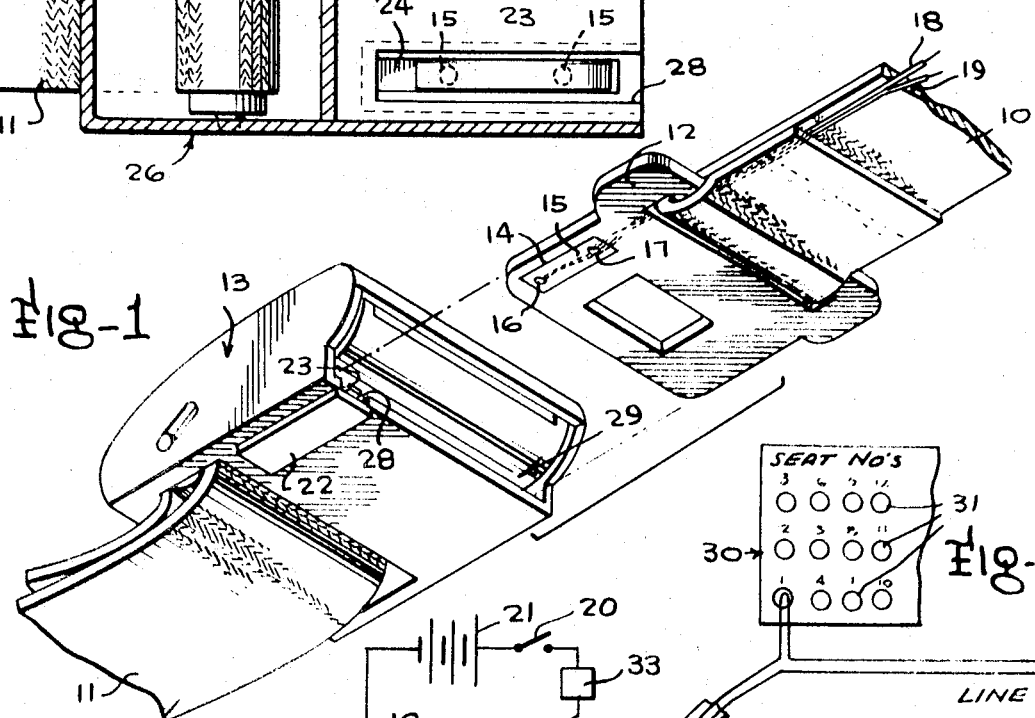
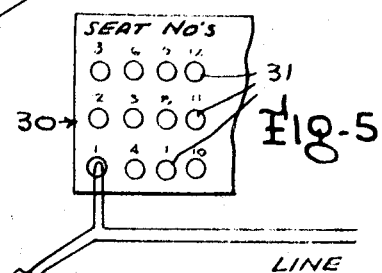
INVENTORS
WILLIAM S. ROUTZAHN &
DENIS S. MOESER
BY
Sherman Levy
ATTORNEY

VEHICLE SEATBELT WARNING AND IGNITION CONTROL SYSTEM

The present invention relates to seatbelts, and more particularly to a safety seatbelt construction which will prevent operation of a vehicle or the like when the seatbelt is not engaged, and wherein in one form of the invention, a lighting system or warning panel is provided to indicate to an operator of aircraft, buses, trains or the like that one or more passengers does not have the seatbelt operatively engaged.

Safety seatbelts have heretofore been provided, as for example, as shown in prior U.S. Pat. Nos.

2,510,115
2,802,073
2,880,789
3,147,819
3,154,167
3,166,146

The present invention has advantages over such prior devices in that there is provided a foolproof efficient construction which will automatically assure that the electrical circuit in the vehicle or other device will be interrupted except when the seatbelts are properly engaged.

In addition, in accordance with the present invention, the pilot of an aircraft or operator or other person working on aircraft, trains, buses or the like, will be automatically and immediately advised when one or more passengers have not properly fastened their seatbelts, so that necessary action can be taken to assure fastening of the seatbelts by the passengers before the vehicle or other member is operated.

Another object is to provide a device of the character described that is economical to produce, durable in form, and conducive to the most economical use of materials and uniformity of members formed therefrom.

Still further objects and advantages will become apparent in the subsequent description in the specification.

In the drawings:

FIG. 1 is a fragmentary bottom perspective view of the present invention with the belt in unbuckled position.

FIG. 2 is a fragmentary sectional view with parts broken away for clarity of illustration and showing the seatbelt buckled.

FIG. 3 is a sectional view taken on the line 3—3 of FIG. 2.

FIG. 4 is a diagrammatic view of the electrical contacts and associated parts.

FIG. 5 is a fragmentary view illustrating a modification.

Referring in detail to the drawings, and more particularly to FIGS. 1 through 4 of the drawings, the numerals 10 and 11 indicate portions of a pair of flexible belt sections which have male and female coupling elements 12 and 13 connected thereto, and the coupling elements 12 and 13 coact to define or provide a buckle assembly 26 for a seatbelt construction 27. As shown in the drawings, the male coupling element 12 is provided with a slot 14 therein, and an insulated strip 15 is adapted to be fixedly mounted in the slot 14 for a purpose to be later described. A pair of spaced apart electrical contacts 16 and 17 are suitably mounted in the insulated strip 15. Wires or conductors 18 and 19 are electrically connected to the contacts 16 and 17. As shown in FIG. 4, there is provided an electrical circuit that includes an ignition switch 20 as well as member such as a battery or source of electrical energy 21.

The female coupling element 13 is adapted to be provided with a groove or cutout 28. The numeral 22 indicates an insulated support member that is fixedly connected to the female coupling element 13 adjacent to the groove 28, and the support member 22 is adapted to be aligned with or in registry with strip 15 when the male coupling element 12 is properly engaged in the female coupling element 13.

The numeral 23 indicates a conductor bar made of a suitable material such as metal, and the bar 23 may have an offset or grooved end portion 24. One or more resilient means such as coil springs 25 are interposed between the bar 23 and support member 22, and the coil springs 25 are adapted to have their ends respectively connected to these parts.

The numeral 29 indicates a space or chamber within the female coupling element 13 for receiving therein the male coupling element 12 when the parts are properly engaged.

Attention is now directed to FIG. 5 of the drawings, wherein the numeral 30 indicates a panel that may have a plurality of individual lights or warning units 31 that are adapted to be electrically connected to respective seatbelts 27 so as to indicate to the pilot of an aircraft or for indicating to the operator of a train, bus, or the like, when one or more passengers have failed to properly fasten their seatbelts.

From the foregoing, it will be seen that there was been provided a safety seatbelt and warning system, and in use with the parts arranged as shown in FIGS. 1 through 4 of the drawings, and with the assembly mounted in a vehicle such as an automobile, it will be seen that the vehicle cannot be operated until the seatbelt is properly fastened or engaged. Thus, the present invention assures that a person must properly fasten his or her seatbelt before the vehicle can be operated.

The above functions are brought about due to the fact that the buckle assembly 26 of the seatbelt 27 has the switch mechanism that automatically deenergizes the electrical circuit or the vehicle ignition system 33 until the seatbelt is fastened. Thus, the female coupling element 13 has the support member 22 of insulated material mounted therein, and the conductor bar 23 is held in place adjacent to the support member 22 by means of the springs 25. In addition, these springs 25 serve to urge or bias the bar 23 in the proper direction so that the proper amount of force will be exerted to complete the electrical circuit at the desired time.

The male coupling element 12 has the insulated strip 15 mounted in the slotted portion 14 and the pair of spaced apart electric contacts 16 and 17 are suitably mounted in the insulated strip 15.

It will, therefore, be seen that as long as the male coupling element 12 is separated from the female coupling element 13, that the electrical circuit to the ignition switch 20 will be interrupted or broken, whereby even though a person inserts the key in the ignition switch, the vehicle cannot be operated. Thus, a safety feature is is provided which assures that the vehicle can only be operated when the seatbelts are properly engaged or fastened, so that the vehicle cannot be driven while the seatbelts are not being properly used.

It will be noted that when the male coupling element 12 is inserted properly in the chamber or recess 29 of the female coupling element 13, that the metal conductor bar 23 will bridge the pair of contacts 16 and 17 so as to establish electrical communication between these contacts 16 and 17. Then, when the ignition switch 20 is actuated by means of the key, the vehicle can be operated in the desired manner. The bar 23 is adapted to have its end portion 24 slightly curved or offset, so as to help guide the parts to their proper location and to assure that contact will be made in the desired manner.

The parts can be made of any suitable material and in different shapes or sizes.

The present invention can be used in waist types of seatbelts as well as harness types, and can be used in any type of automobile or the like. With the belt in an open position, it is practically impossible to start the automobile by turning the ignition switch. However, with the safety buckle closed, as shown in FIG. 2, the circuit is completed and the driver can then start the vehicle. The device is constructed so that short circuits and shock will be prevented. The springs 25 assure that the proper amount of tension will be provided to make contact at the desired time. Thus, the present invention will assure that drivers will use seatbelts and will also caution riders to use their seatbelts, and thus the device will help save lives and be a safety feature for automobiles and the like. The device can be used in various types of equipment such as trains, buses, airplanes and the like, as well as in conjunction with automobiles. The device will make it necessary for the driver to use the belts and/or harness before the automobile can be started. The device is convenient to install and use, and the device will help minimize the chances of a person being injured in a vehicle for failure to properly engage the seatbelt. The buckle for the seatbelt has a generally conventional construction as to those parts which are not specifically described and illustrated herein as being a part of the present invention.

With reference to the arrangement shown in FIG. 5, this assembly can be used in equipment where a plurality of passengers are being transported such as in airplanes, buses, trains and the like, and it will be seen that when the buckle 26 of a particular seatbelt 27 is not properly fastened, that a light or suitable indicator 31 on the panel 30 will be actuated, so that the operator of the airplane or other person can take the necessary steps to have the person fasten the seatbelt.

The device of FIG. 5 with the safety electric switch as used on automobile ignition systems works similar for buses and trains and aircraft, with the exception that instead of bypassing the ignition or actuating the same, it will go through the lighting system or warning panel to show that the passenger does not have the seatbelt engaged as ordered. When the captain or commander of the aircraft notifies the passengers to fasten the seatbelts, a light 31 on the panel 30 is adapted to turn on as the passengers fasten the seatbelts, and this will tell the captain or stewardess exactly which passenger will not have the belt fastened, and she or he can quickly point out which passenger has to be ordered to do the same. This system will, therefore, function as a safety setup as well as being a time saving arrangement, and will enhance passenger safety aboard aircraft, vehicles, or the like.

The present invention is also adapted to be used in conjunction with boats and ships, including hydrofoils, Hovercraft, hydropontoon boats, and the like.

As an alternate, the present invention may embody a locked out ignition having a combination audiovisual signal that would stop when the seatbelt is fastened, or could be nullified by a self-reset switch so the same signal would be given the next time the driver enters the car. This could possibly be accomplished by an interlocking switch with the left front door.

In addition, if desired, all passenger belts may be tied into the system, and they would all have to be buckled up either on an ignition lockout or the same audiovisual setup previously mentioned could be utilized.

Although the invention has been herein shown and described in what is conceived to be the most practical and preferred embodiment, it is recognized that departures may be made therefrom within the scope of the invention which is not to be limited to the details disclosed herein but is to be accorded the full scope of the claims so as to embrace any and all equivalent devices and apparatus.

What is claimed is:

1. A safety seatbelt comprising a pair of flexible belt sections, male and female coupling elements connected to said belt sections, said male section having a slot therein, an insulated strip fixedly mounted in said slot, a pair of spaced apart contacts mounted in said strip, conductors electrically connected to said contacts, an electrical circuit including an ignition switch electrically connected to said conductors; said female coupling element being provided with a groove that is arranged in alignment with the slot when the male coupling element is in engagement with the female coupling element, an insulated support member operatively connected to said female coupling element and arranged adjacent to said groove, a conductor bar arranged adjacent to said support bar and said bar having a curved end portion, and coil springs interposed between said bar and support member.

* * * * *